United States Patent [19]

Franey

[11] Patent Number: 4,944,916

[45] Date of Patent: Jul. 31, 1990

[54] CORROSION INHIBITION

[75] Inventor: John P. Franey, Bridgewater, N.J.

[73] Assignee: AT&T Bell Laboratories, Murray Hill, N.J.

[21] Appl. No.: 399,427

[22] Filed: Aug. 23, 1989

Related U.S. Application Data

[63] Continuation of Ser. No. 7,105,946, Oct. 8, 1987, abandoned.

[51] Int. Cl.⁵ .................. C23F 13/00; C23F 15/00
[52] U.S. Cl. ................................. 422/8; 422/7; 204/148
[58] Field of Search ............... 422/7, 8; 204/148, 197

[56] References Cited

U.S. PATENT DOCUMENTS

| | | | |
|---|---|---|---|
| 1,766,646 | 6/1930 | Jones | 422/8 |
| 3,007,767 | 11/1961 | Bolt et al. | 422/8 X |
| 4,156,751 | 5/1979 | Yenni, Jr. et al. | 428/458 X |
| 4,864,089 | 9/1989 | Tighe | 219/10.55 E |

OTHER PUBLICATIONS

*Modern Packaging*, Charles A. Southwick, Jr., Feb. 1945, pp. 125–127.

Primary Examiner—Robert J. Warden
Assistant Examiner—Amalia L. Santiago
Attorney, Agent, or Firm—Bruce S. Schneider

[57] ABSTRACT

Corrosion of metals such as silver and copper by sulfur and chlorine containing entities are substantially prevented by surrounding these materials with a suitable polymeric structure. The structure should be a polymer containing a material such as copper or aluminum that reacts readily with corrosive gases. In one advantageous embodiment a polymer bag containing approximately 35 weight percent of dispersed, powdered copper is employed to enclose a metal containing structure such as a printed circuit board. Use of this expedient substantially reduces corrosion of the printed circuit board.

5 Claims, 1 Drawing Sheet

CORROSION INHIBITION

This application is a continuation application Ser. No. 105,946, filed on Oct. 8, 1987, now abandoned.

BACKGROUND OF THE INVENTION

1. Technical Field

This invention relates to metal corrosion and in particular corrosion due to interaction with chlorine or sulfur containing entities.

2. Art Background

Metals such as copper, nickel, and silver are extremely important for their use in a vast number of applications. Not only are such metals used for their aesthetic appeal in ornamental objects but also a large number of industries, such as the electronics industry, rely extensively on these materials because of their electrical and structural properties. Whether the metals are used for ornamental purposes, structural purposes, or for high technology products, corrosion, e.g., sulfidization or chlorination, of the metal surface seriously degrades is usefulness for many desired applications. A variety of expedients have been developed to either prevent or impede the corrosion of metals, e.g., metals utilized in ornamental objects or structures employed in electronic industries. For example, these objects have been enclosed in a wrapper where the wrapper itself or an object placed within the wrapper contains volatile organic corrosion inhibitor (VCI). The VCI such as cyclohexamine ammonium benzoate, evaporates, coats the metal to be protected and thus produces corrosion resistance. For example, paper is impregnated with a VCI and placed in a polymeric bag containing the article to be protected.

Despite extensive use, typical corrosion inhibition processes such as the use of VCI's are not entirely satisfactory for all applications. For example, in the electronics industries it is often undesirable to have metal objects coated with an organic material. The disadvantage of coatings is particularly significant when the metal object is to undergo a treatment that is sensitive to contaminants. An exemplary situation involves the protection of lead frames utilized in the packaging of VLSI circuits. In such applications the lead wires from the VLSI chip are welded to the lead frame. This welding is not successfully accomplished in the presence of even a small amount of contaminant. If the lead frame is protected by a VCI, subsequent welding is prevented unless a meticulous and costly cleaning process is employed. Thus, for applications such as electronic chip manufacture the VCI's are not advantageous. As a result, these lead frames are generally not protected and corroded portions are removed before the lead frame is utilized. Although problems of contamination are avoided, substantial waste occurs.

In addition, in many applications such as the protection of ornamental objects or electronic structures, volatile corrosion inhibitors do not maintain their efficacy for a sufficient period of time. The duration of volatile corrosion inhibitor protection terminates soon after all the volatile organic material has evaporated from its carrying medium, e.g., the impregnated paper. Yet, this termination is not easily detected. Prompt steps cannot be taken to maintain corrosion inhibition. Thus, for applications that are sensitive to contamination or for applications requiring long-term protection, present methods of corrosion inhibition are often not acceptable.

SUMMARY OF THE INVENTION

It has been found that when an object is surrounded by an enclosing structure such as a polymeric bag, corrosion from the environment trapped within the surrounding structure is significantly less than the corrosion induced by permeation of gaseous sulfur or chlorine containing entities through the surrounding structure. This permeation of corrosive materials is substantially prevented by the presence within the polymer of a scavenger such as copper or aluminum. For example, a bag is produced by introducing copper or aluminum particles into a polymer and then forming the polymer, e.g., low density polyethylene, into a bag. No volatile material is employed, and thus no difficulty with contamination is experienced. Additionally, even in relatively severe environments corrosion protection is maintained for extended periods of time. For example, silver in an environment of two parts per billion of $H_2S$ is protected for periods substantially exceeding a year.

DETAILED DESCRIPTION

Figure 1:
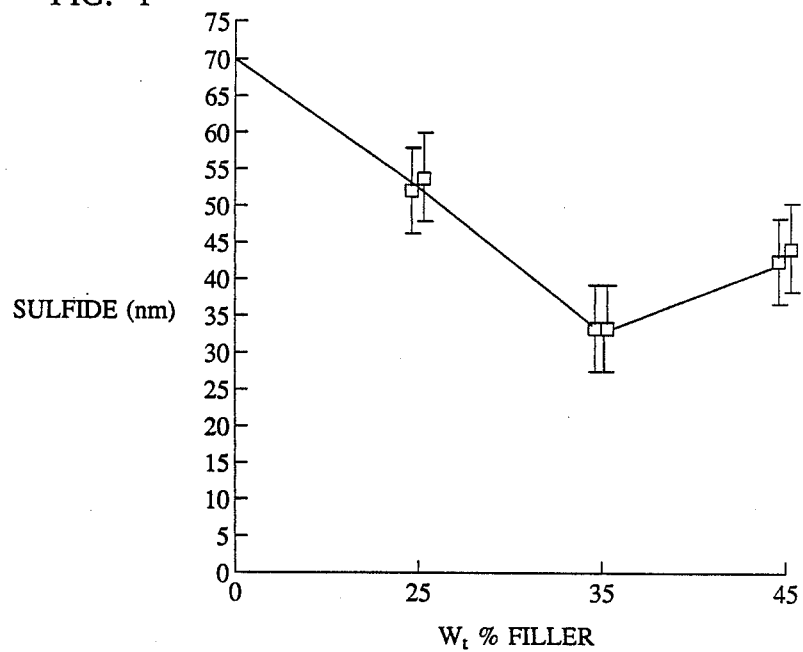
FIGS. 1 and 2 are illustrative of results attainable with the invention.

As discussed, the corrosion of metals such as silver or copper by sulfur or chlorine containing entities is avoided for substantial periods of time by surrounding the object containing these metals with a specific enclosing structure. In particular, a polymer material forming the structure should contain a substantial surface area of either copper or aluminum.

The composition of the polymer is not critical. For example, polymers that are easily formed into bags such as low density polyethylene are advantageously employed. Similarly, thermosetting materials that are formed into structurally supportive plates are also employable. For example, a polyester thermoset material is formed into a box utilized to store the metal to be protected. As previously discussed, corrosion by sulfur or chlorine containing entities is caused primarily by the permeation of the environment through the surrounding structure and not by the gases trapped when the surrounding structure is closed. It is, however, desirable to use a surrounding structure that limits entrance of corrosive gases in the environment to levels less than one part per trillion through processes other than permeation.

The particular metal incorporated into the polymer depends on the metal to be protected. For example, to protect silver or copper from sulfur entity corrosion either copper or aluminum incorporated into the polymer is useful. Copper is, however, somewhat more efficient at removing sulfur entities from the permeating environment and, thus, is more efficacious. For the protection of metals such as aluminum and brasses from chlorine entities, the presence of copper in the polymeric structure is also more efficient than the use of aluminum.

The greater the surface area of the protecting metal, e.g., the aluminum or copper, the more efficient the corrosion protection. Generally, particulates of the protecting metal are dispersed in the polymer. Metal flakes (as opposed to metal spheres), interdispersed in the polymer produce greater surface area per unit weight and thus more efficiently protect from corrosion. However, particle geometries such as spherical geometry do provide protection and are not precluded. Although not critical, typically, polymeric formulations having a metal particle surface area greater than $7.0 \times 10^{-6}$ cm$^2$ and preferably greater than $4.5 \times 10^{-6}$ cm$^2$ are advantageously employed. It is desirable to produce a ratio between the surrounding structure internal surface area and the metal surface area greater than 1 cm$^2$/cm$^2$, and preferably greater than 1.5. Plating the internal or external surfaces of the surrounding structure does not provide adequate protection. A contemplated explanation is that porosity of or cracks in the plating allow excessive permeation of corrosive gases. However, the use of a plated layer in addition to embedded particles is not precluded.

The presence of copper and aluminum in most polymers causes a physical degradation of the polymer properties. Generally, this degradation does not unacceptably reduce the strength of polymer until a weight percentage of dispersed metal substantially greater than 35 weight percent is reached. Since the period of protection is increased as the weight percentage of metal in the polymer is increased, it is advantageous, although not essential, to use as much metal in the polymer as possible, within the limitations of acceptable polymer degradation. For example, in low density polyethylene bags a weight percentage of up to 35 percent does not substantially decrease the physical integrity of the bag. (Although the physical integrity of the bag is still good it is reduced, nevertheless, relative to its strength without the metal).

The introduction of the protecting metal into the polymer is accomplished by any one of several conventional polymer chemistry processing techniques. For example, the metal in the form of particles is introduced into polymer by internal mixers as described in "Polyethylene", R. A. V. Raff and J. B. Allison, *Interscience Pub., Ltd.*, New York, p. 399, 1956. The polymer is formed into pellets by the "Caviar Cut" method as described in Raff and Allison, *supra*, p. 401, then formed into the desired surrounding structures by procedures such as extrusion blow molding as described in *DuPont Magazine*, 1949.

The invention also has the advantage that the termination of protection is indicated by a color change. For example, as the copper particles in the polymer scavenger sulfur entities from the permeating environment a chemical reaction is induced that produces a black material. Thus, a substantial decrease in protection is indicated by development of a black color on the outside of the bag and the total loss of efficacy is indicated by the development of a dark black color both on the outside and inside surfaces of the bag. Similarly, the interaction of aluminum with the environment produces a yellow color change.

The following examples are illustrative of the conditions employed in the use of the invention.

EXAMPLE 1

Pellets of low density polyethylene were prepared having various loading levels of 7 μm diameter copper powder. The loading levels utilized were 25, 35 and 45 weight percent of copper. The pellets were then utilized to form polymer bags utilizing a Braybender extrusion apparatus. The bags were extruded to a thickness of 2 mils ±15 percent, were approximately 5½ inches wide, and cut and heat sealed every 7 inches. A silver lead frame for an integrated circuit chip carrier was placed in each bag. The bags were then heat sealed at each end three times to ensure proper sealing.

Figure 2:
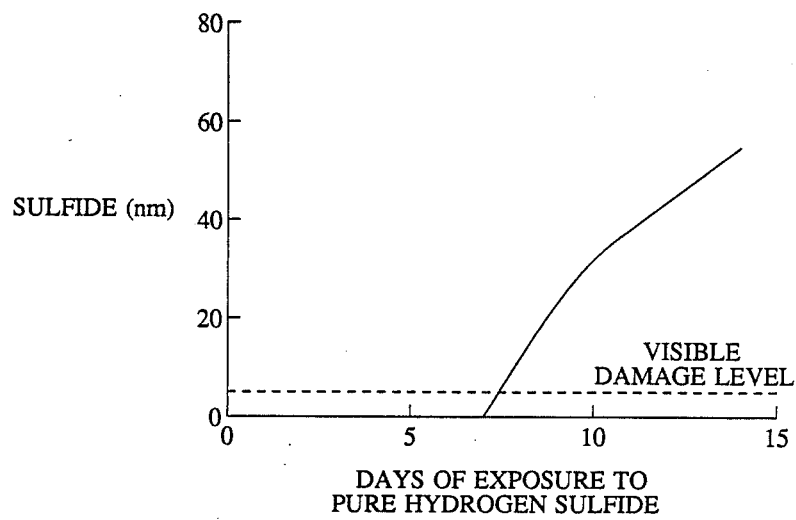

Several bags made from each level of copper loaded material were placed in a chamber. The chamber was evacuated and backfilled with an atmosphere of pure hydrogen sulfide. At intervals, one bag for each loading level was removed during a 14-day test period. The level of sulfide growth on the lead frames was measured utilizing energy dispersive X-ray analysis as described in G. W. Kammolott, *Applied Spectroscopy*, 35, 324 (1981). FIG. 1 shows the measured thickness of sulfide for various percentage fills after 14 days. FIG. 2 shows the results over the 14-day period for a sample having a 35 weight percent fill of copper. It should be noted that the hydrogen sulfide atmosphere level was extremely concentrated since significantly lower concentrations would not produce noticeable levels of corrosion for an extended period of time.

What is claimed is:

1. A process for protecting an article including a metal region from corrosion comprising the steps of locating said article in an enclosure, said enclosure having a means for providing said protection comprises particles, said particles comprising a protecting metal chosen from the group consisting of aluminum and copper wherein said particles are embedded in said polymer by introducing and dispersing particulates into said polymer and wherein said surface area of said protecting metal is sufficient to regard said corrosion.

2. The process of claim 1 wherein said article comprises an electronic component.

3. The process of claim 1 wherein said article comprises silver.

4. The process of claim 3 wherein said enclosure comprises a bag.

5. The process of claim 1 wherein said enclosure comprises a bag.

* * * * *

UNITED STATES PATENT AND TRADEMARK OFFICE
CERTIFICATE OF CORRECTION

PATENT NO. : 4,944,916

DATED : July 31, 1990

INVENTOR(S) : J. P. Franey

It is certified that error appears in the above-identified patent and that said Letters Patent is hereby corrected as shown below:

In the Claims, column 4, line 39, "protection comprises" should read --protection wherein said enclosure comprises a polymer and said means for providing said protection comprises--

Signed and Sealed this

Eleventh Day of February, 1992

Attest:

HARRY F. MANBECK, JR.

Attesting Officer     Commissioner of Patents and Trademarks